United States Patent
Brodesser et al.

(10) Patent No.: US 6,793,870 B1
(45) Date of Patent: Sep. 21, 2004

(54) METHOD FOR LINKING TWO PLASTIC COMPONENTS

(75) Inventors: Kay Brodesser, Rutesheim (DE); Hans Peter Drespling, Heidenheim (DE); Hans Jensen, Kirchheim (DE); Günter Kachler, Ingersheim (DE); Horst Schneider, Waiblingen (DE); Jürgen Stehlig, Neckartailfingen (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 0 days.

(21) Appl. No.: 09/937,202

(22) PCT Filed: Mar. 24, 2000

(86) PCT No.: PCT/DE00/00883

§ 371 (c)(1),
(2), (4) Date: Sep. 21, 2001

(87) PCT Pub. No.: WO00/58067

PCT Pub. Date: Oct. 5, 2000

(30) Foreign Application Priority Data

Mar. 25, 1999 (DE) .......................................... 199 13 501

(51) Int. Cl.⁷ .......................... B29C 45/14; B29C 70/76
(52) U.S. Cl. ..................... 264/513; 264/250; 264/259; 264/266; 264/274
(58) Field of Search ................................. 264/510, 512, 264/513, 250, 254, 255, 259, 266, 271.1, 274, 275, 277, 279; 425/129.1; 156/242, 245

(56) References Cited

U.S. PATENT DOCUMENTS

| | | | | |
|---|---|---|---|---|
| 4,352,772 A | * | 10/1982 | Bezner ........................ | 264/229 |
| 4,724,111 A | * | 2/1988 | Iwata et al. .................. | 264/155 |
| 4,743,481 A | * | 5/1988 | Quinlan et al. ............. | 428/35.7 |
| 4,752,208 A | * | 6/1988 | Iwata et al. .................. | 425/577 |
| 5,266,262 A | * | 11/1993 | Narayama et al. .......... | 264/513 |
| 5,445,782 A | * | 8/1995 | Sadr ............................ | 264/513 |
| 5,814,252 A | * | 9/1998 | Gouldson et al. .......... | 264/40.5 |
| 5,897,823 A | * | 4/1999 | Davis et al. ................. | 264/266 |
| 6,415,941 B1 | * | 7/2002 | Huse ........................... | 220/562 |
| 6,537,484 B2 | * | 3/2003 | Nakagawa et al. ......... | 264/513 |
| 6,579,486 B1 | * | 6/2003 | Nakajima et al. ........... | 264/255 |

FOREIGN PATENT DOCUMENTS

| | | |
|---|---|---|
| DE | 68 01 992 | 10/1968 |
| DE | 2 024 082 | 12/1971 |
| DE | 2 110 156 | 9/1972 |
| DE | 32 39 765 | 5/1985 |
| DE | 38 04 619 | 8/1989 |
| EP | 0 567 702 | 11/1993 |
| FR | 1 503 392 | 10/1967 |
| FR | 2 462 261 | 7/1979 |
| FR | 2 681 006 | 3/1993 |

\* cited by examiner

*Primary Examiner*—Angela Ortiz
(74) *Attorney, Agent, or Firm*—Collard & Roe, P.C.

(57) ABSTRACT

The invention relates to a method for linking a first plastic component (6) with a second plastic component (9). According to the inventive method, the first component (6) is introduced into an injection mold with at least one connecting section (12) at which the link with the second component (9) is to be established. The second component (9) is formed by injection-molding plastic material onto the connecting section. A surface of the connecting section (12) is at least partially covered by the plastic material of the second component (9). At least one of the components may consist of a plastic material that requires only a relatively narrow temperature range to be moldable in the molten state. At least one binder body is formed at the surface intended to be covered by the injection-molded plastic material which binder is firmly linked with the surface. Said binder melts when contacted with the heat energy of the injection-molded plastic material and fuses with the injection-molded plastic.

16 Claims, 1 Drawing Sheet

METHOD FOR LINKING TWO PLASTIC COMPONENTS

CROSS REFERENCE TO RELATED APPLICATIONS

Figure 1:
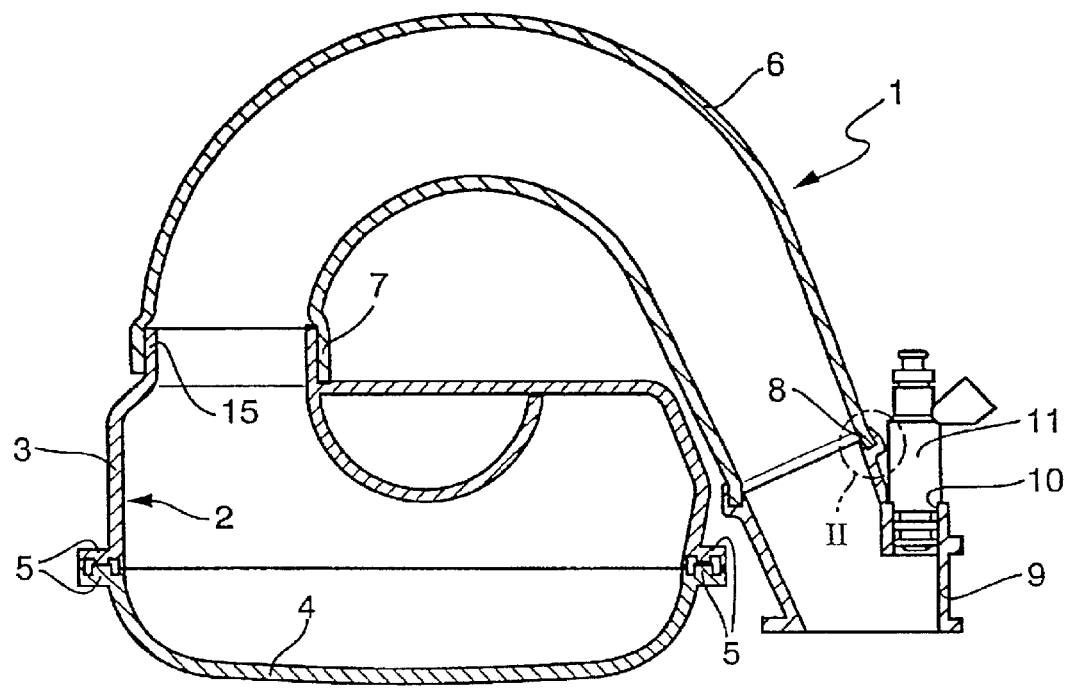

Applicants claim priority under 35 U.S.C. §119 of German Application No. 199 13 501.0 filed Mar. 25, 1999. Applicants also claim priority under 35 U.S.C. 365 of PCT/DE00/00883 filed Mar. 24, 2000. The international application under PCT article 21 (2) was not published in English.

This invention relates to a method of joining a first component made of plastic to a second component made of plastic.

Such a method is known from European Patent 0 567 702 B1, for example. To connect a first plastic component, such as an intake manifold of an intake manifold system of an internal combustion engine to a second plastic component such as a flange of this intake manifold system, the first component having at least one connecting section on which the connection to the second component is to be created is introduced into an injection mold. The second component is then formed by integral molding of plastic onto the connecting section of the first component, whereby one surface of the connecting section is at least partially wetted by plastic of the second component.

Through appropriate shaping of the connecting section, in particular through an increasing wall thickness and a suitable embedding of the connecting section in the plastic material of the integrally molded component, where the integrally molded component largely encompasses or surrounds the connecting section of the other component, a formfitting connection that can withstand relatively high static stresses can be established between the components.

U.S. Pat. No. 5,266,262 describes blow-molded intake manifolds onto which a common flange is integrally molded. The intake manifolds have connecting sections which are embedded in the plastic of the flange in integral molding. Ring-shaped projections extending outward are formed on these connecting. Sections and are anchored like a barb in the integrally molded flange in a form-fitting manner. The strength, in particular the tensile strength, of this connection is increased in this way.

U.S. Pat. No. 4,752,208 describes a method which is used for integral molding of a coupling sleeve onto a corrugated tube hose. The injection mold and the injection process are coordinated so that at least two corrugations on the end of the corrugated tube to be sheathed are compressed, with the one corrugation sealing the injection mold while the other corrugation is embedded as an anchor in the integrally molded sheathing. In addition, the parameters are selected in this process so that the sheathed corrugated tube end softens, fuses at the surface and forms a bond with the integrally molded sheathing. However, the sheathed corrugated tube end and the compressed corrugations are retained as such.

In order for such a connection to have a long lifetime even under high-frequency dynamic stresses and to be able to guarantee that the connection will be leakproof even at high pressures during this lifetime, the components must be bonded together. To this end, the first component onto which the second component is to be integrally molded may be heated before being Inserted into the injection mold so that the plastic softens or begins to fuse in the area of the connecting section. In this condition, the first component can then be inserted into the infection mold. Then the molding operation is performed, with the molten injected plastic and the partially fused plastic at the surface of the first component being fused together. The desired intimate bonding connection is formed on solidification of the melts which have thus been mixed in this way. The plastics to be joined by bonding in this way are preferably compatible and are based on the same basic substance.

However, such a method cannot be used when at least one of the components is made of a plastic which has a relatively small or narrow temperature range for processability of the melt thereof. In other words, there as only a relatively short distance between a minimum melt temperature, which is the minimum necessary for processing of the melt, and a maximum melt temperature above which it is no longer possible to process the melt as intended. This is the case with polyamide [nylon] plastics, for example. For example, if the first component is made of such a plastic, then the melt on the connecting section which is formed by heating will have cooled again by the start of the injection molding operation to the extent that the desired bonded connection cannot be achieved consistently. In addition, it is relatively complicated to heat or partially fuse the first component and transfer it to the injection mold. If, in contrast with this, the component to be integrally molded is made of a plastic of the above-mentioned type, the melt compound will rapidly cool to a temperature below the aforementioned minimum melt temperature as soon as the melt compound comes in contact with the first plastic component in the integral molding operation.

The present invention relates to the object of designing a method of the type such that a bonded connection can be established relatively inexpensively between two plastic components even if the plastic of one component and/or the other has a relatively narrow temperature range for processability of its melt.

This object is achieved according to the present invention.

This invention is based on the general idea of orienting the thermal energy transferred from the integrally molded plastic to the first component through the design of bonding bodies at the surface of the connecting section of the first component in such a way that these bonding bodies thus melt and can fuse with the integrally molded plastic. Thus, due to this controlled thermal conduction, preferred melting zones are formed on the connecting section where surface melting takes place rapidly enough to form the desired high-quality bonded connection of the two components.

According to a preferred embodiment, the bonding bodies may be formed by elevations that are formed on the component at the time of its manufacture and project away from the surface of the connecting section, so that the bonding bodies are formed in one piece with the connecting section. Due to the fact that the bonding bodies are taken into account in the production and design of the first component, there is no increase in cost for production of the first component. In addition, due to their integration into the shape of the first component, these bonding bodies are connected to it in a highly effective manner. Since the bonding bodies project away from the surface of the connecting section, the heat transferred to the integrally molded plastic on coming in contact with the latter cannot be dissipated rapidly enough over the connecting section or the first component, so there is a buildup of heat with the desired result that the plastic of the first component melts at the surface in the area of the connecting section at the bonding bodies, permitting fusion with the integrally molded plastic.

With the method proposed according to this invention, it is also possible to integrally mold a component which, as an injection molded part, consists of a plastic which has a low viscosity in the melt, onto a component made of a plastic which has a high viscosity in the melt. The highly viscous plastic on the bonding bodies is heated and liquefied to the extent that it can mix or bond with the low-viscosity integrally molded plastic. In particular, it is thus possible to design the first component as a blow-molded part, in other words, the first component is produced by a blow-molding method. In order for this to be possible, the first component must be made of a high-viscosity plastic.

To improve the surface melting of the bonding bodies, the temperature at which the plastic of the second component is injected into the injection mold, i.e., the Injection temperature, is selected so as to be close to the upper limit of the temperature range in which an injection molding method can be carried out with this plastic. This measure increases the amount of heat that can be transferred from the injected plastic to the first component.

Additional important features and advantages of the method according to this invention are derived from the subordinate claims, the drawings and the respective description of the figures on the basis of the drawings.

It is self-evident that the features mentioned above and to be explained below can be used not only in the combination described here but also in any other combinations or alone without going beyond the scope of the present invention.

A preferred embodiment of this invention is illustrated in the drawings and is explained in greater detail in the following description.

Figure 2:
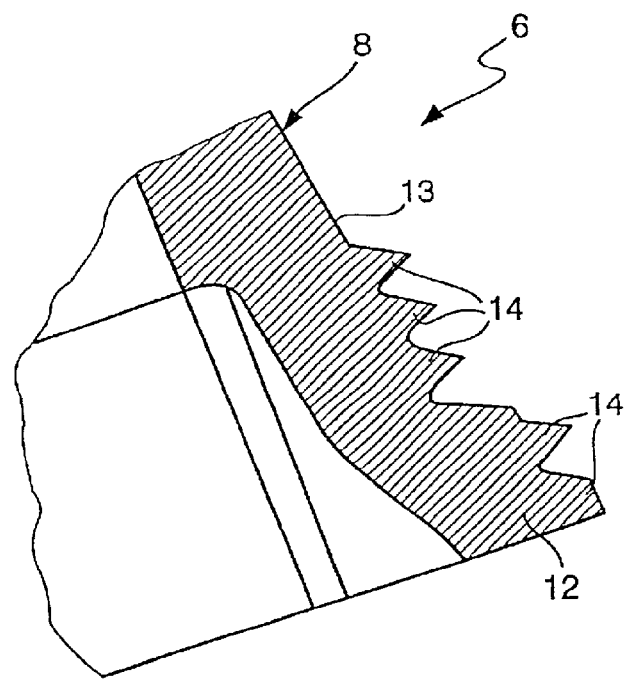

FIG. 1: shows a schematic sectional view through an intake manifold system of an internal combustion engine manufactured using the method according to this invention, and FIG. 2: shows an enlarged detail of a section labeled as II in FIG. 1.

According to FIG. 1, a modular intake manifold system 1, which distributes to individual combustion chambers of an n internal combustion engine (not shown) the air supplied by an air intake for combustion in the internal combustion engine, has an air distributor module 2 which has a modular design itself and is composed of an upper one-piece air distributor top part module 3 and a lower one-piece air distributor bottom part module 4. The air distributor modules 3 and 4 each have a collar or shoulder 5 that projects outward and runs completely around the to circumference, where the two modules 3 and 4 can be joined together, in particular by a friction welding method.

Several one-piece intake manifold modules 6 are connected or attached to the top side of the air distributor top part module 3, but only one is illustrated in FIG. 1, because the components of the intake manifold system 1 arranged behind the plane of the drawing in the direction of view have been omitted for the sake of simplifying the diagram. The intake manifold module 6 is connected at one end at a pipe end 7 to the air distributor module 2 and at the other end at a pipe end 8 to a flange module 9 which can be connected to the internal combustion engine. Thus, the air introduced into the air distributor module 2 through the intake manifold module 6 can reach the respective combustion chamber of the internal combustion engine.

A receptacle 10 is provided in the flange module 9 so that an injection valve 11 can be mounted in the receptacle, as indicated in FIG. 1.

The intake manifold system is manufactured as follows:

First the intake manifold modules 6 are produced, preferably with the help of a blow-molding method, so the shape of the intake manifold modules 6 can be varied relatively easily; for example, the pipe diameter, the radius of curvature and the pipe length can be adapted in this way to the different configurations of the internal combustion engine. The intake manifold modules 6, each assigned to one flange module 9, are then inserted into an injection mold, at least at their pipe ends 8. Then an injection molding process can be carried out to form the flange module 9. The pipe end 8 assigned to the flange 8 is designed so that it is encompassed by the plastic of the flange module 9 on both sides, i.e., on the inside and outside with respect to the intake manifold module 6. In addition, the wall thickness of the intake manifold module 6 increases in this pipe end 8, so that a highly effective anchoring of the intake manifold module 6 in the flange module 9 is produced on the whole. Thus, the pipe end 8 is joined in a form-fitting manner to the flange module 9. The method according to this invention is also used to form a high-quality, strong and tight bonded connection between the intake manifold module 6 and the flange module 9.

To this end, bonding bodies 14 are formed at least on an exterior surface 13 on a connecting section 12 of the pipe end 8 where the connection to the flange 9 is formed. These bonding bodies 14 here are in the form of elevations running in a ring around the circumference, projecting outward away from the surface 13 and tapering to a tip. The dimensions of these elevations are small relative to the dimensions of the components 6, 9 which are to be joined together. For example, the elevations 14 may project 1 mm away from the surface 13. The bonding bodies 14 are designed in one piece with the connecting section 12, i.e., they are unmolded together with it in the manufacture of the intake manifold module 6. In integral molding of the plastic to form the flange module 9, the selected geometry of the bonding bodies 14 causes the thermal energy transmitted in them from the integrally molded plastic to the connecting section 12 to collect and cause the bonding bodies 14 to begin to melt. In this way, the melts can become mixed together, so that the two components 6 and 9 become fused together in the area of their bonding. The desired form-fitting bonding which is strong and tight is formed between the components 6 and 9 on solidification of this combined melt of the two components in the area of the joint.

After carrying out the method according to this invention, the pipe ends 7 of the intake manifold modules 6 facing fit away from the flange module 9 are joined to the air distributor module 2 as illustrated in FIG. 1, for which purpose the connection of the intake manifold module 6 to the air distributor module 2 is designed as a plug connection here. The pipe end 7 forms an external connection while the air distributor top part module 3 forms an internal connection 15. Connections 7 and 15 may be joined together in the traditional manner, e.g., by a welded joint, a shrink-fit joint, an adhesive bond or by a combination of different joining methods. Then the air distributor bottom part module 4 is integrally molded onto the air distributor top part module 3 by a friction welding method, for example.

FIG. 2 shows a part of the pipe end 8 before integral molding of the second component 9, i.e., at a time when the elevations or the bonding bodies 14 have not yet been deformed by the integral molding process or fused to the integrally molded plastic. Due to the method according to this invention, the bonding bodies 14 at least partially enter the melt or the injection molding compound and are thus integrated into the injection molded part 9.

What is claimed is:

1. A method of joining a first component (6) made of plastic to a second component (9) made of plastic, where the first component (6) is introduced into an injection mold with at least a connecting section where the connection to the second component (9) is to be formed, the second component (9) being produced by integral molding of plastic onto the connecting section (12) of the first component (6), one surface (13) of the connecting section (12) being wetted at least partially by the plastic of the second component (9), comprising at least one bonding body (14) is formed on the surface (13) of the connecting section (12) which is provided for wetting by the plastic of the second component (9), said bonding body being fixedly connected to it and designed so that it melts in integral molding of the plastic of the second component (9) due to the thermal energy of the integrally molded plastic and it melts with the integrally molded plastic, whereupon the bonding body (14) is at least partially subsumed into the integrally molded plastic and becomes integrated into the integrally molded component (9);

the first component is an intake manifold (6) of an intake manifold system (1) which receives the air from an air supply which is provided for combustion in the internal combustion engine and distributes it to individual combustion chambers of the internal combustion engine, and the second component is a flange (9) of the intake manifold system (1) which can be connected to the internal combustion engine;

the intake manifold system (1) has a modular design, with an air distributor module (2) made of plastic which can be connected to the air supply of the internal combustion engine, with several intake manifold modules (6), each made of plastic and designed in one piece, connected at their one pipe end (7) to the air distributor module (2) and each assigned to one of the combustion chambers of the internal combustion engine, and with at least one flange module (9) made of plastic in one piece to which at least one of the intake manifold modules (6) is connected at its other pipe end (8).

2. The method according to claim 1, comprising each bonding body (14) is formed by an elevation which projects away from the surface (13) of the connecting section (12) and is integrally molded onto the first component (6) in the manufacture of the latter, so that each bonding body (14) is produced in one piece with the connecting section (12).

3. The method according to claim 2, comprising each elevation (14) tapers with increasing distance from the surface.

4. The method according to claim 2, comprising the elevation (14) run along the surface (13) in the form of a ring, in the case of a cylindrical first component (6).

5. The method according to claim 1, comprising the temperature at which the plastic of the second component (9) is injected into the injection mold (injection temperature) is close to the upper limit of a temperature range in which the injection molding method can be carried out with this plastic.

6. The method according to claim 1, comprising the pressure at which the plastic of the second component (9) is injected into the injection mold (injection pressure) is close to the upper limit of a pressure range in which the injection molding process can be carried out with this plastic.

7. The method according to claim 1, comprising the plastic of the first component (6) has a high viscosity relative to that of the integrally molded plastic of the second component (9).

8. The method according to claim 1, comprising the first component (6) is designed as a blow-molded part.

9. The method according to claim 1, comprising the respective melting points of the plastics of the two components (6,9) are in approximately the same range.

10. The method according to claim 1, comprising the plastics of the two components (6,9) each have only a relatively narrow temperature range for processing their melts.

11. The method according to claim 1, comprising the components (6,9) are each made of a polyamide plastic.

12. The method according to claim 1, comprising the components (6,9) are each made of a fiber-reinforced plastic.

13. The method according to claim 1, comprising the first component is an intake manifold (6) of an intake manifold system (1) which receives the air from an air supply which is provided for combustion in the internal combustion engine and distributes it to individual combustion chambers of the internal combustion engine, and the second component is a flange (9) of the intake manifold system (1) which can be connected to the internal combustion engine.

14. The method according to claim 4, wherein the ring is a circular ring, and wherein the first component is a round cylindrical component.

15. The method according to claim 8, wherein the blow-molded part is a component produced by a blow-molding method.

16. The method according to claim 12, wherein the fiber-reinforced plastic is selected from the group consisting of a fiberglass-reinforced polyamide plastic and a carbon fiber-reinforced polyamide plastic.

* * * * *